United States Patent
Chang et al.

(10) Patent No.: US 8,312,036 B2
(45) Date of Patent: *Nov. 13, 2012

(54) RECOMMENDED SYSTEMS

(75) Inventors: Kenneth N. Chang, San Jose, CA (US); David A. Koski, Cupertino, CA (US); Pedraum R. Pardehpoosh, Palo Alto, CA (US); Ralph E. Zazula, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 11/529,848

(22) Filed: Sep. 29, 2006

(65) Prior Publication Data
US 2008/0082565 A1    Apr. 3, 2008

(51) Int. Cl.
*G06F 7/00* (2006.01)
*G06F 17/30* (2006.01)

(52) U.S. Cl. .......................... 707/767; 707/758
(58) Field of Classification Search .................. None
See application file for complete search history.

(56) References Cited

U.S. PATENT DOCUMENTS

| | | | |
|---|---|---|---|
| 6,438,579 B1 * | 8/2002 | Hosken | 709/203 |
| 6,912,505 B2 * | 6/2005 | Linden et al. | 705/14 |
| 2002/0165905 A1 | 11/2002 | Wilson | |
| 2002/0169676 A1 * | 11/2002 | Floyd | 705/26 |
| 2002/0184108 A1 | 12/2002 | Hatakama et al. | |
| 2003/0037041 A1 * | 2/2003 | Hertz | 707/1 |
| 2003/0158844 A1 | 8/2003 | Kramer et al. | |
| 2003/0195884 A1 * | 10/2003 | Boyd et al. | 707/7 |
| 2006/0167757 A1 | 7/2006 | Holden et al. | |
| 2006/0212362 A1 | 9/2006 | Donsbach et al. | |
| 2006/0235873 A1 * | 10/2006 | Thomas | 707/102 |
| 2007/0038614 A1 * | 2/2007 | Guha | 707/4 |
| 2007/0106672 A1 * | 5/2007 | Sighart et al. | 707/10 |
| 2007/0143128 A1 * | 6/2007 | Tokarev et al. | 705/1 |
| 2007/0143281 A1 * | 6/2007 | Smirin et al. | 707/5 |
| 2007/0156677 A1 * | 7/2007 | Szabo | 707/5 |
| 2007/0244868 A1 * | 10/2007 | Grubb et al. | 707/3 |
| 2008/0077574 A1 * | 3/2008 | Gross | 707/5 |

OTHER PUBLICATIONS

Amazon.com: Help > Enhancing Your Shopping Experience > Your Community > So You'd Like to . . . Guides. Sep. 2006.
Amazon.com: Help > Enhancing Your Shopping Experience > Your Community > Listmania Lists. Sep. 2006.

* cited by examiner

*Primary Examiner* — Rehana Perveen
*Assistant Examiner* — Raheem Hoffler
(74) *Attorney, Agent, or Firm* — Novak Druce + Quigg LLP (57) ABSTRACT

Providing a recommendation of one or more items is disclosed. In some embodiments, a selection of a set of one or more items to be included in a recommendation is received from a first member of an online community, and the recommendation is stored so that the recommendation can be presented to a second member of the online community when an indication is received that the recommendation is of interest to the second member.

32 Claims, 5 Drawing Sheets

RECOMMENDED SYSTEMS

BACKGROUND OF THE INVENTION

Customers visiting physical stores are typically approached by or have access to salespeople who can aid in identifying items that meet their needs, answer questions about various items, recommend related items, etc. For example, a customer shopping in a computer store wanting to purchase a computer system may be presented by a salesperson of the store, based upon the customer's intended use of the computer system, with a recommendation of a computer model, compatible peripherals and software, information relating to the manner in which to configure the system, reasons pertaining to why the recommended items will serve the customer's intended use, etc.

Similar levels of customer service, however, do not exist in the context of typical online stores. Potential customers of an online store may have access to descriptions of individual items and reviews by other customers on individual items. However, it may be desirable to purchase a set of items, at least some of which are to be used together for a particular purpose, and it would be useful to receive recommendations on which items to select based on the intended use of at least some of the items as a set. In some cases, the administrators of an online store may define a few thematic sets that include multiple related items that a customer can purchase as a set. However, if the intended uses of such few administrator defined sets do not meet a customer's needs, the customer must individually research and identify items without receiving advice or feedback on the interoperability of the items and whether the combination of items selected will meet the needs of the customer's intended use.

For example, a customer shopping for a computer system at an online computer store may find it helpful to receive one or more recommendations on computer systems that are appropriate for the customer's needs rather than having to individually identify various components such as a particular computer model, compatible peripherals, needed software, etc., that would be suitable as well as research the manner in which to configure the system for its intended use. It is useful to a customer to have access to recommendations on sets of complementary items and their potential uses as a set, especially if such recommendations can aid the customer in making a decision for the customer's own needs.

Thus, there is a need for an improved manner to recommend items to potential customers of an online store.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing a recommendation of one or more items is disclosed. In some embodiments, a selection of a set of one or more items to be included in a recommendation is received from a first member of an online community, and the recommendation is stored so that the recommendation can be presented to a second member of the online community when an indication is received that the recommendation is of interest to the second member.

A "recommended system" in some embodiments includes one or more items or products that have been recommended for use as a set, potentially for one or more specified purposes. In some embodiments, at least some of the items included in a recommended system have a thematic relationship and when used together may serve a combined function possibly different from the functions associated with the individual items. One or more of the items included in a recommended system may comprise separate hardware, software, or other components, capable of being used independently of each other, e.g., in a context other than in the recommended system. In this sense, a recommended system represents in various embodiments a suggested set of components and/or a manner of configuring and/or integrating such components to enable them to be used together to perform some desired task or set of tasks.

Allowing members of a relevant community, e.g., an online community (such as users of an online store), to create or define recommended systems that can be provided to other members of the community, e.g., other users or customers of the store in the case of an online store, when appropriate is disclosed. In many cases, the user community may represent a wealth of information about the potential uses to which the various products of an online store, for example, in various combinations and/or combined with one or more products of a third party (i.e., other than the online store) may be put, the ideal way to configure and/or integrate and use components for particular purposes, etc.

A user having some knowledge or expertise on a topic may desire to create a recommended system that includes items or products associated with the topic. Such a recommended system may be useful to other users interested in the same or a similar topic and may be presented to another user when an indication of interest in an associated or similar topic and/or one or more items or types of items included in the recommended system is received. In various embodiments, an item or product included in a recommended system may be generically specified by the type or category of the item (e.g. "computer") or may be specified by manufacturer, model, version, and/or any other associated identifier (e.g., "MacBook Pro"). In addition to specifying a set of items, the user creating a recommended system may specify or select for an item included in the recommended system one or more options or configurations associated with the item, e.g., if multiple options or configurations exist for the item, as well as provide recommendations on the number, quantity, capacity, range, etc., of an item or an associated option.

A user creating a recommended system may include additional information to support the recommendation such as reasons as to why one or more of the selected items are useful for or pertinent to an associated topic, how to configure one or more of the items included in the recommended system, examples of how the recommending user has used items included in or similar to those included in the recommended system for the associated topic or a similar topic, links to a personal webpage or other resources with additional related information, etc. It may be desirable to describe and/or include examples (e.g., via embedded images or photographs, video, links to other related pages, etc.) of how one or more of the items included in the recommended system are used with respect to the topic associated with the recommended system to provide credibility in the validity of the recommendation. Any other appropriate information, such as information on the background or credentials of the author of a recommended system, may be chosen to be included with a recommended system to establish the validity of the recommended system.

Figure 1:
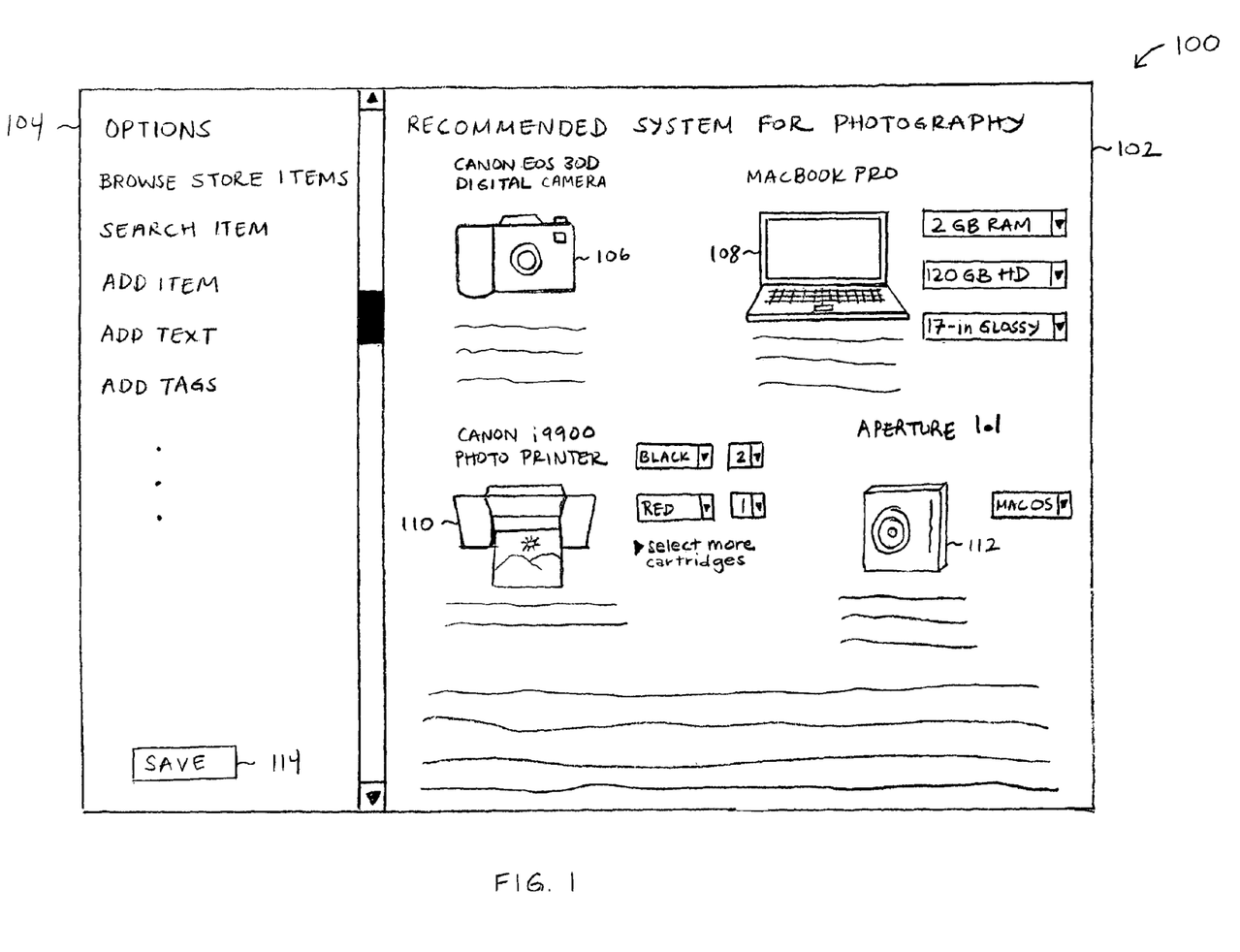
FIG. 1 illustrates an embodiment of an interface used to create a recommended system.

FIG. 1 illustrates an embodiment of an interface used to create a recommended system. In some embodiments, a user is provided with a graphical user interface (GUI), such as GUI 100, to create a recommended system 102. The example given in FIG. 1 depicts the creation using GUI 100 of a recommended system 102 associated with the topic of photography. A user having knowledge about photography may create such a recommended system and may select items or products that the user believes to be useful for or pertinent to the topic of photography. GUI 100 includes various options 104 to aid a user in the creation of a recommended system 102. For example, a user may have the option to browse through an associated online store to find a desired item and select an item to be included in the recommended system 102; a user may have the option to search for a desired item and in response to such a search be presented with one or more items matching the search term(s) that can be added to the recommended system 102 upon selection; a user may have the option to add a desired item to the recommended system 102, for instance, by identifying the item by name, item number, or other identifier; a user may have the option to add text to be associated with one or more of the items included in the recommended system 102 or with the recommended system 102 as a whole; a user may have the option to add tags or keywords to be associated with the recommended system 102 which can be used to categorize the recommended system 102 so that it can be retrieved and presented to other users of the online store who express interest in the associated or a similar topic and/or one or more of the items or type of items included in the recommended system 102; etc.

In the example of FIG. 1, a user defining recommended system 102 has selected a set of items that the user believes would be useful for someone interested in photography. Specifically, a camera 106, computer 108, printer 110, and a photo editing software application 112 have been selected to be included in recommended system 102. In the given example, each item included in recommended system 102 corresponds to a particular product. In alternative embodiments, a type or category of an item (i.e. "computer") may be specified in a recommended system instead of a particular product (i.e. "MacBook Pro"). In some embodiments, the specification of an item in a recommended system includes specifying one or more options associated with the item. For example as shown in FIG. 1, the user defining recommended system 102 has selected 2 GB RAM, a 120 GB hard drive, and a 17-inch glossy display for computer 108; two extra black and one extra red ink cartridges with printer 110; and a MAC OS platform compatible version of the photo editing software application 112. In some embodiments, if one or more options associated with an item are not specified by a user defining a recommended system, default values associated with such options are automatically selected for the item.

In some embodiments, in addition to selecting items and/or selecting options associated with the selected items, the user defining recommended system 102 includes other information such as reasons as to why one or more items and/or associated options have been selected, e.g., why one or more of the items and/or associated options are particularly useful for or pertinent to photography; how to configure one or more of the items; how to use the items to perform various photography related tasks; examples of photography projects performed using items included in or similar to those included in recommended system 102; information on the background and/or expertise of the recommending user; and/or any other appropriate information or content to support the recommendation. In some embodiments, the user defining recommended system 102 specifies or selects keywords or tags to be associated with and categorize the recommended system 102 that, for example, can be used to retrieve the recommended system 102 for other users who express interest in a topic or item that matches, is associated with, and/or is related to one or more of such tags. For recommended system 102 of FIG. 1, for example, tags such as "photography", "photos", "camera", etc., may be selected. Once a user has finished defining a recommended system, in some embodiments, the user has the option to save 114 the recommended system 102 in an archive of recommended systems associated with an online store so that the recommended system 102 can be provided to users of the online store who express interest in a topic associated with or an item or type of item included in the recommended system 102.

FIG. 1 illustrates one example of an interface that can be used by a user of an online store to create a recommended system. Alternatively, any other appropriate interface configuration and associated options can be employed for the creation of a recommended system.

Figure 2:
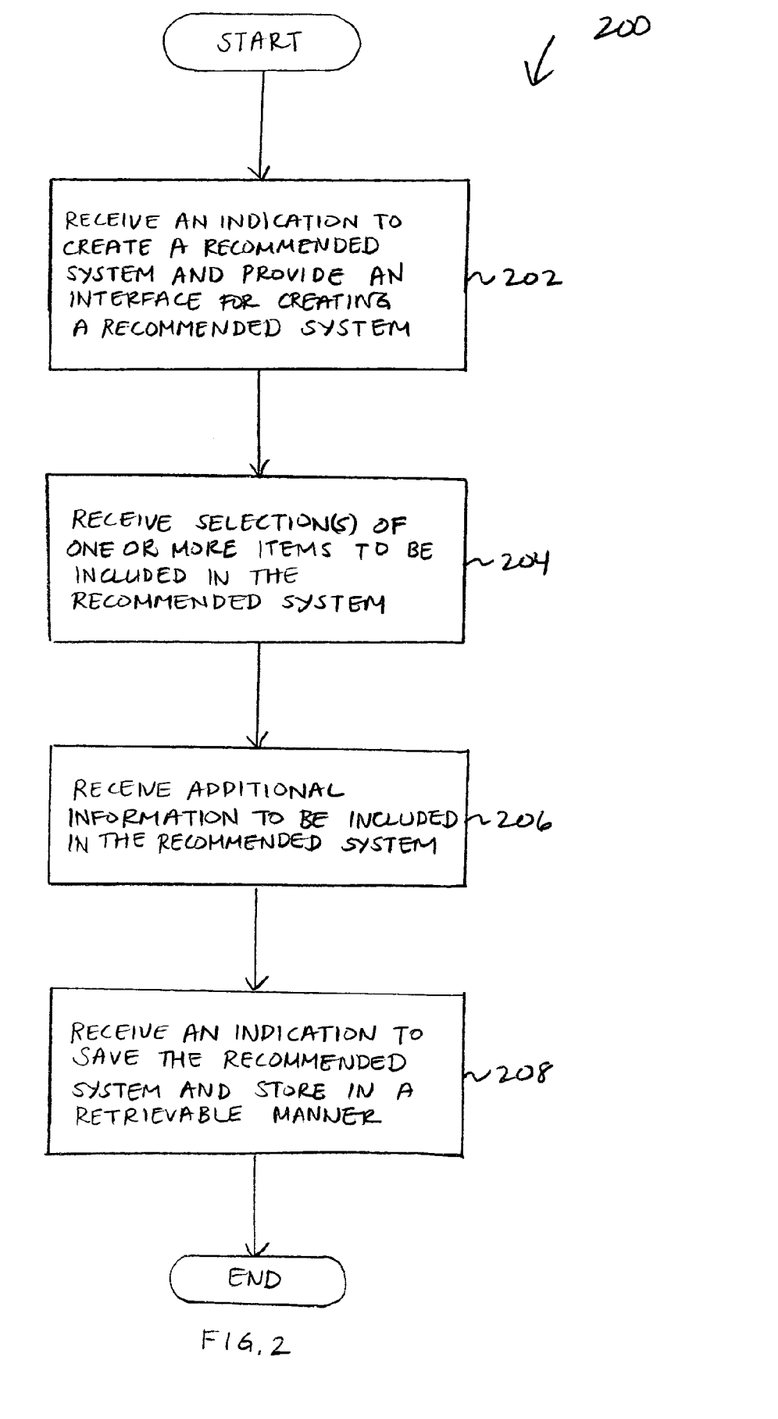
FIG. 2 illustrates an embodiment of a process for creating a recommended system.

FIG. 2 illustrates an embodiment of a process for creating a recommended system. In some embodiments, process 200 is employed to create recommended system 102 of FIG. 1. Process 200 starts at 202 at which an indication to create a recommended system is received from a user. Such an indication may be received, for example, in response to a selection of an option to create a new recommended system by a user from an interface associated with an online store with respect to which the recommended system is being created. Step 202 includes providing an interface for creating a recommended system to a user in response to receiving an indication to create a recommended system from the user. In some embodiments, the interface for creating a recommended system comprises a GUI, such as GUI 100 of FIG. 1. At 204, selections of one or more items to be included in the recommended system are received from the user. In some embodiments, 204 includes receiving the specification of one or more options, if any exist, for one or more of the items selected for the recommended system, e.g., by the recommending user. In some embodiments, if one or more user selectable options for an item are not specified by the recommending user, default values associated with the options are automatically selected. At 206, additional information associated with one or more of the items and/or options selected at 204 and/or the recommended system as a whole is received. In some embodiments, the additional information of 206 is at least in part provided by the user creating the recommended system. The recommending user, for example, may desire to include explanations of why various items and/or associated options have been selected for the recommended system, how to configure one or more of the recommended items, how to employ one or more of the recommended items to perform various tasks, etc. Moreover, the recommending user may desire to provide examples of how one or more of the recommended items and/or similar items have been used for various purposes, such as with respect to a topic associated with the recommended system. In some cases, the recommending user may choose to provide background on himself/herself to strengthen the validity of the recommendation. In various embodiments, the additional information received at 206 may include text or other appropriate multimedia content such as images, photographs, graphics, animations, video, audio, links to other pages or sites, etc. In some embodiments, information related to an item, such as a product description and/or specification associated with an item available from the online store, is automatically included with an item when it is selected to be included in a recommended system, and the user creating the recommended system may have the option to edit, modify, delete, append to, etc., such information. In some embodiments, the additional information received at 206 includes one or more tags or keywords supplied by the recommending user that are to be associated with the recommended system and that can be used to index or categorize the recommended system for future retrieval. At 208, an indication to save the created recommended system is received, and the recommended system is stored in a retrievable manner. Process 200 subsequently ends.

In some embodiments, process 200 is employed to create a new recommended system from scratch. Alternatively, a new recommended system can be created by using an existing recommended system as a baseline. In some embodiments, an existing recommended system can be modified or updated by the user who created the recommended system. For example, when a user logs into his/her online store user account, the user may have the option to access one or more recommended systems created by the user, e.g., to update and/or modify the recommended systems. A recommended system may be created, such as using process 200, by any internal or external user of an online store, such as an employee, administrator, shopper, user browsing through the online store, etc. Once a recommended system has been created, it can be presented to any user of the online store who expresses interest in a topic associated with the recommended system and/or one or more of the items or types of items associated with the recommended system. In some embodiments, a user can externally link to a recommended system, for example, on a blog or personal web site, and/or include a link to a recommended system in an email or other type of electronic message.

Figure 3:
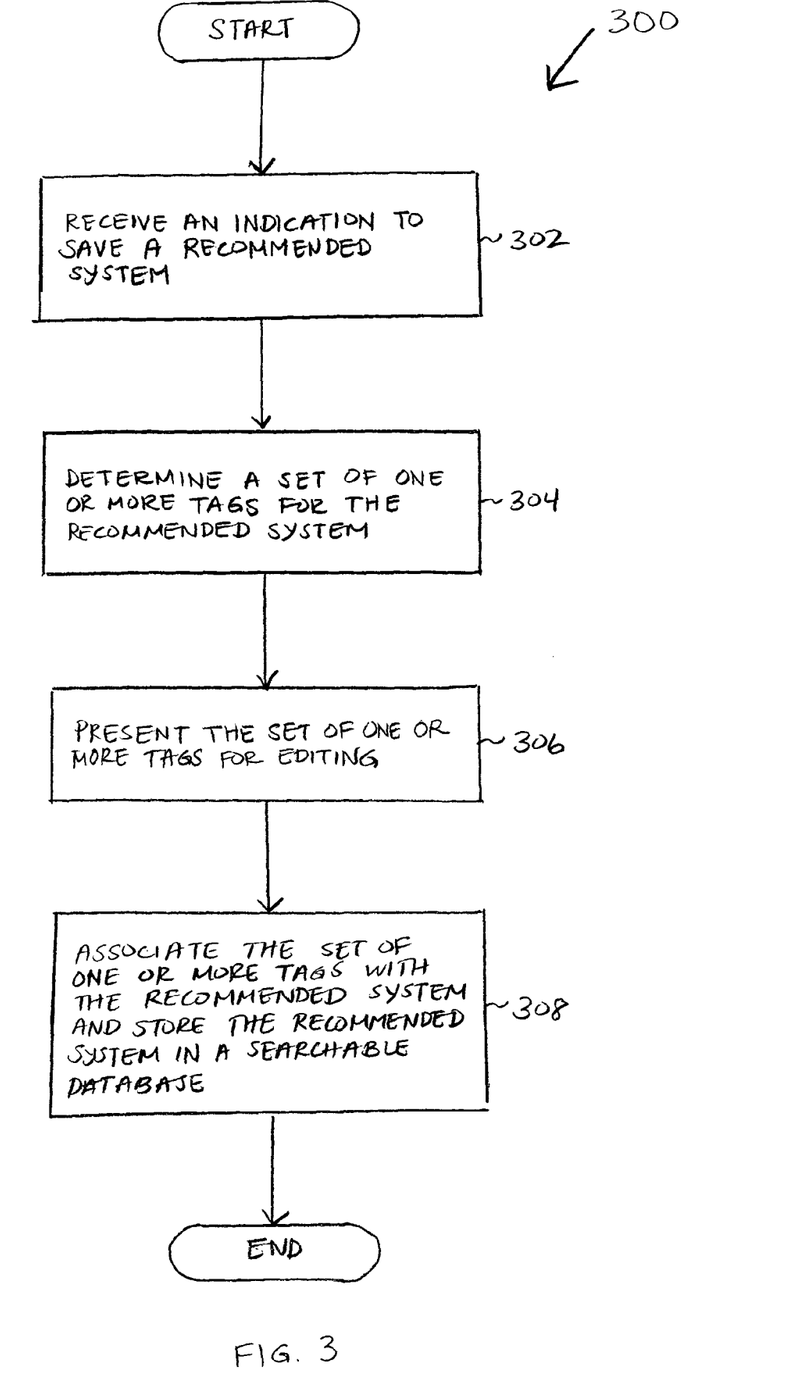
FIG. 3 illustrates an embodiment of a process for storing a recommended system.

FIG. 3 illustrates an embodiment of a process for storing a recommended system. In some embodiments, process 300 is employed at 208 of process 200 of FIG. 2. Process 300 starts at 302 at which an indication to save a recommended system is received. At 304, a set of one or more tags or keywords are determined for the recommended system. In some embodiments, the user creating the recommended system supplies one or more tags for the recommended system, such as at 206 of process 200 of FIG. 2. In some embodiments, the user creating the recommended system is prompted for tags at 304. In some embodiments, the content of the recommended system is parsed to automatically extract one or more applicable tags. In some embodiments, one or more tags associated with the items included in the recommended system are included in the set of tags to be associated with the recommended system. At 306, the set of one or more tags determined at 304 are presented to the user creating the recommended system for editing. The user may select all or a subset of the presented tags, may modify one or more of the tags, may add to the set of presented tags, etc., for example, based on the relevance of the various tags to the topic associated with and/or items included in the recommended system. In some embodiments, step 306 is optional. In some embodiments, the recommending user is not provided with the set of tags to be associated with the recommended system for editing, unless, for example, an indication is expressly received from the user to edit the set of tags to be associated with the recommended system. At 308, the set of tags determined at 304 and/or selected by the recommending user at 306 are associated with the recommended system (e.g., in metadata associated with the recommended system), and the recommended system is stored in a searchable database. Process 300 subsequently ends.

Figure 4:
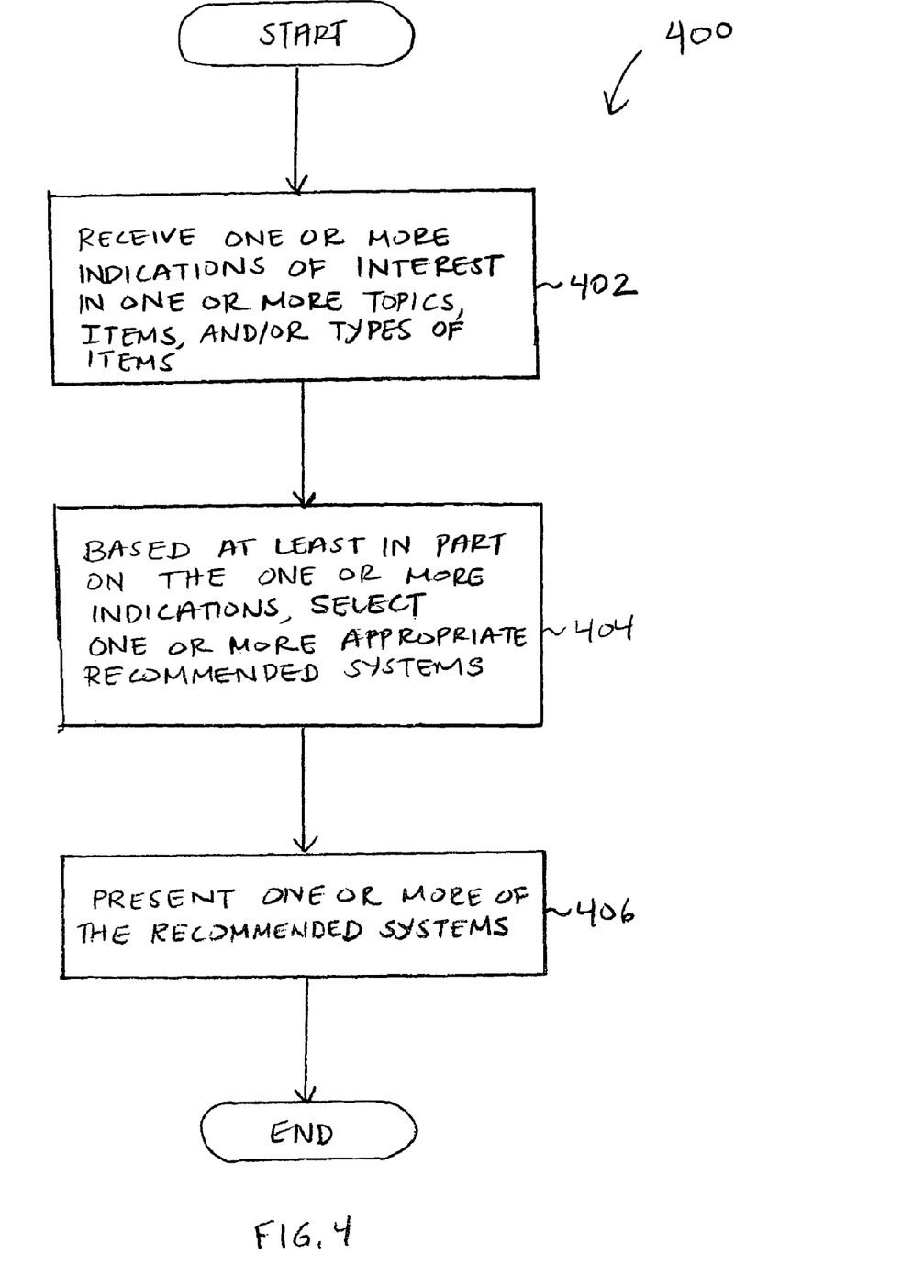
FIG. 4 illustrates an embodiment of a process for providing one or more recommended systems to a user of an online store.

FIG. 4 illustrates an embodiment of a process for providing one or more recommended systems to a user of an online store. In some embodiments, a recommended system is presented to a user when the user expresses interest in a topic associated with, items or types of items included in, and/or tags associated with the recommended system. Process 400 begins at 402 at which one or more indications of interest in one or more topics, items, and/or types of items are received, for example, from current and/or past activity of a user within the online store. Such indications of interest may be received at 402, for example, when the user views, browses, and/or navigates to particular pages (e.g., product detail pages) or category pages (i.e. pages associated with particular topics) of the online store; when the user searches for one or more items using associated keywords; when the user expresses an intention to purchase one or more items, for example, by adding the items to his/her online cart; when the user expresses interest in other content associated with the online store; etc. In some embodiments, one or more tags associated with items or content (e.g., particular pages, other recommended systems, etc.) and/or keywords used to search for items that a user is interested in are used to identify the items or types of items that are of interest to the user and to find relevant recommended systems for the user, e.g., recommended systems that have the same or similar tags or keywords. In some embodiments, in addition to and/or instead of receiving one or more indications of interest at 402, past browsing and/or purchasing history of the user are considered to determine the user's interests. At 404, based upon the one or more indications received at 402 of the topics, items, and/or types of items currently of interest to the user and/or based upon the past interests of the user, one or more appropriate recommended systems are selected, e.g., from an archive or database of recommended systems available at the online store. At 406, one or more of the recommended systems determined at 404 are presented to the user for consideration. In some embodiments, when a recommended system is presented to a user, such as at 406, it is rendered with an associated interface that provides the user with one or more appropriate options, such as an option to buy one or more of the items included in the recommended system, options to change one or more of the product options associated with the one or more items included in the recommended system, an option to add one or more items to the recommended system, an option to remove one or more items from the recommended system, options to view other items related to the items included in the recommended system, an option to vote on the usefulness of the recommended system, options to review one or more of the items included in the recommended system and/or to review the recommended system, options to view reviews of items included in the recommended system and/or reviews of the recommended system by others, options to view, vote for, and/or add tags associated with the recommended system, etc. Process 400 subsequently ends.

As described above with respect to process 400, recommended systems may be surfaced for users of an online store in various manners depending on a user's current and/or past activity with respect to the online store. For example, consider a user interested in cameras. When an indication is received that the user is interested in cameras (e.g., because the user has navigated to a page associated with cameras, because the user has searched for terms related to cameras, because the user has expressed interest in other items related to cameras, because the user has expressed interest in content associated with cameras, because the user has added a camera or an item related to a camera to the user's online cart, because the user has been interested in cameras in the past, for example, based on the user's past purchase history or browsing history, etc.), one or more recommended systems that include a camera may be provided to the user for consideration. Presumptions of a user's interests can be derived from multiple such indications so that possibly more pertinent recommended systems can be provided to the user. For example, if a user is looking at a product detail page of a particular camera and the user's cart already includes a printer, one or more recommended systems that include both a camera and a printer (such as recommended system 102 of FIG. 1) may be presented to the user for consideration. Thus, in some embodiments, recommended systems are presented to a user based upon all or a subset of information known about a user which may be based upon current and/or past indications of the user's activity with respect to the online store. In some embodiments, additional information known about a user, such as demographic information obtained about the user from when the user registered for a user account with the online store may be employed in the selection of recommended systems to be provided to the user.

Figure 5:
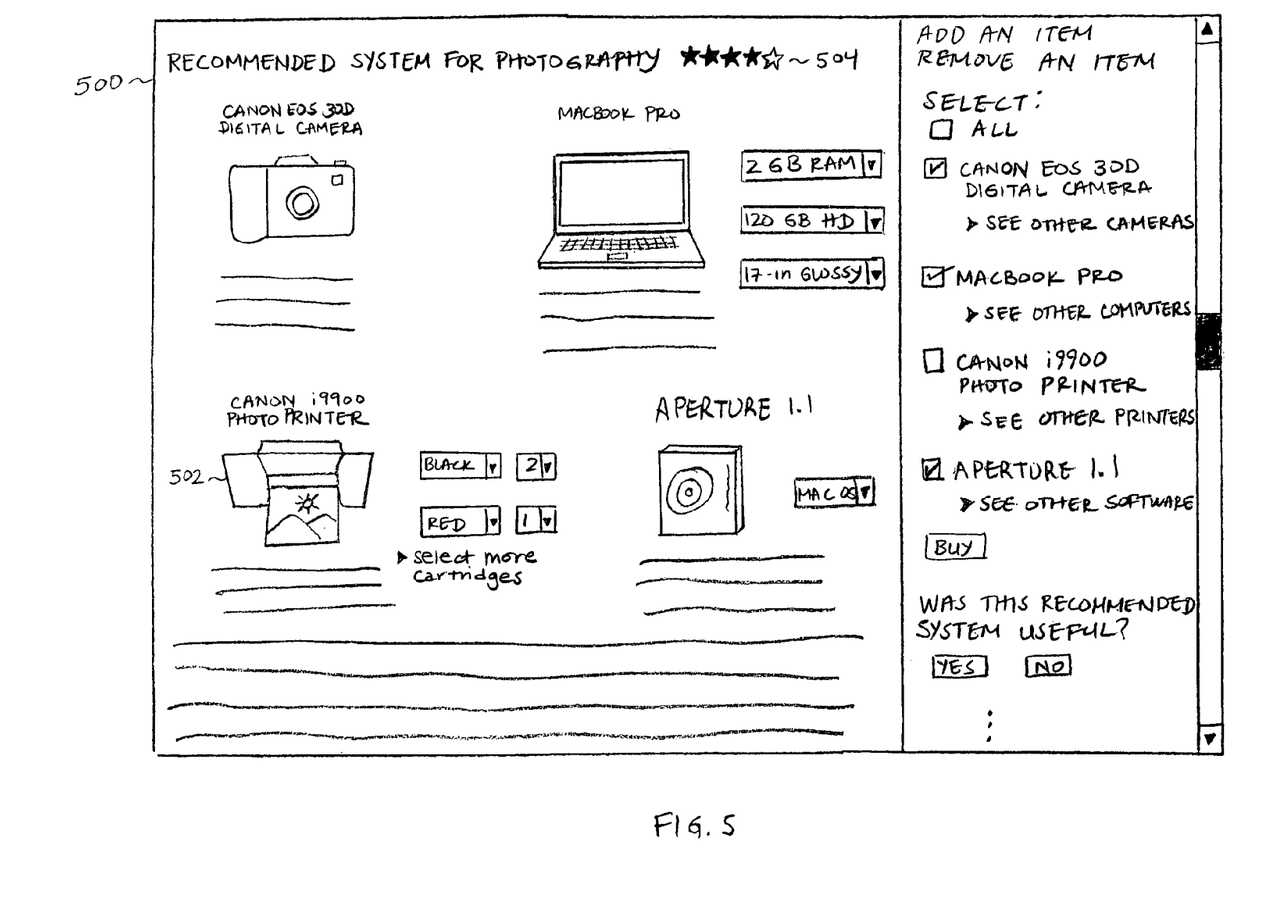
FIG. 5 illustrates an embodiment of a recommended system provided to a user of an online store.

FIG. 5 illustrates an embodiment of a recommended system provided to a user of an online store. In some embodiments, recommended system 500 is provided at 406 of process 400 of FIG. 4. A user presented with a recommended system 500 can view all of the products selected, options selected, and information provided by the recommending user. In some embodiments, a recommended system 500 comprises an interface that can be used by a user to select various products, associated options, and/or quantities for purchase. A user provided with recommended system 500 may select to change one or more of the user selectable options and quantities associated with the various items included in the recommended system 500. In some embodiments, a user may employ an existing recommended system, such as recommended system 500, as a baseline to obtain a custom set of products or items for purchase. For example, based on the user's needs and preferences, the user may choose to add one or more items to recommended system 500, remove one or more items from recommended system 500, change options associated with the items included in recommended system 500, etc. As depicted in the given example, a user may have options to select other related products in addition to and/or instead of the products included in the recommended system 500. Although not illustrated in FIG. 5, a user may have the option to view reviews from other users of the recommended system 500 and/or of items included in the recommended system, and/or the user may have the option to provide a review of the recommended system 500 and/or one or more of the items included in the recommended system. In the given example, the user viewing the recommended system has selected to purchase all items included in the recommended system 500 except printer 502. FIG. 5 illustrates one example of a manner in which a recommended system 500 and associated interface can be provided to a user. Alternatively, any other appropriate configuration can be employed to present a recommended system 500 and associated interface to a user to aid the user in the selection of one or more items or products, e.g., for purchase.

As depicted in the example of FIG. 5, in some embodiments, a user presented with a recommended system has the option to vote on the usefulness of the recommended system so that a usefulness score can be presented with the recommended system to indicate the popularity of the recommended system among users of the online store. In the given example, the usefulness score 504 of recommended system 500 is presented using a five star system, and recommended system 500 has a usefulness score 504 of four out of five stars. In some embodiments, recommended systems that are selected to be presented to a user (e.g., at 404 and/or 406 of process 400 of FIG. 4) are filtered based on their usefulness score so that one or more of the most popular recommended systems are presented to a user. The usefulness score of a recommended system is based at least in part on user feedback via voting. In some embodiments, the usefulness score of a recommended system is based at least in part on the reputation of the author of the recommended system. For example, statistics about the author's purchase history, such as the number of items included in the recommended system that have been purchased by the author, may be employed in the determination of the usefulness score of the recommended system. Other statistics about the author such as the number of recommended systems created by the author, the average usefulness score of the recommended systems created by the author, what percentage of recommended items the author has purchased across all or a subset of recommended systems created by the author, etc., may be tracked and employed in the computation of the usefulness score of a particular recommended system. For instance, if two potential recommended systems that can be provided to a user (such as determined at 404 of process 400 of FIG. 4) have the same usefulness score based on feedback via voting and only one of the two recommended systems is to be provided to the user (such as at 406 of process 400 of FIG. 4), known statistics about the authors of the recommended systems may be used to further weight the recommended systems and select the recommended system to be provided. In some embodiments, the usefulness score associated with a recommended system is stored with the recommended system. In some embodiments, the usefulness score of a recommended system is periodically updated. In some embodiments, the usefulness score associated with a recommended system is dynamically updated whenever a user votes on the usefulness of the recommended system. Although a five star rating system has been illustrated in the example of FIG. 5, any other appropriate manner to present a usefulness score, such as providing the percentage of users who found a recommended system to be useful, may be provided with a recommended system in various embodiments.

In some embodiments, a user can vote on the usefulness of the tags or keywords associated with a recommended system. In some embodiments, a recommended system may be selected to be provided to a user (e.g., at 404 of process 400 of FIG. 4) based on one or more of the most popular tags associated with the recommended system and the extent to which the most popular tags associated with the recommended system relate to the interests of the user. In some embodiments, a user has the option to add tags or keywords to be associated with a recommended system. By allowing users of an online store to provide input with respect to tag or keywords, better categorization of recommended systems associated with an online store may be achieved.

By including facilities for recommended systems as described herein, an online store is able to maintain a constantly evolving set of recommended systems based upon the needs of the users or customers of the store. Community driven recommend systems allow the items or products of an online store to be categorized and grouped based on the needs of the community. For example, recommended systems associated with niche topics of interest to various groups of users of the online store may be created by such users. Similarly, recommended systems for custom stores associated with the online store may be created users.

As is disclosed herein, recommended systems are useful in the context of online stores for presenting sets of items with thematic relationships. Such recommendations on sets of items and their intended use relieve customers from expending large amounts of time in researching for available items. In addition, by receiving recommendations based upon somebody else's expertise or experience, customers receive added assurance of the ability of their purchased items to serve their desired use, resulting in greater confidence in purchases. Furthermore, if customers can at least in part base their decisions on such recommendations, it is more likely that customers will purchase the correct combination of items for their needs and be more satisfied with their purchases.

While many of the examples described in detail above involve recommended systems defined by a user of an online store, the techniques described herein may be applied as well to other contexts in which members of a relevant community, online or otherwise, desire to recommend a set of items, for purchase, use, or otherwise, to other members of the community. For example, users of a product review website, publication, or TV show, etc. and/or customers of a physical store in various embodiments may use various of the techniques described herein to recommend sets of related items to other users.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing a recommendation, comprising:
receiving an indication of a selection of an option by a first member of an online community to create a recommendation to be presented to one or more other members of the online community;
providing to the first member a user interface for defining the recommendation;
receiving from the first member via the user interface a selection of a set of items to be included in the recommendation, wherein the set of items comprises complementary items recommended by the first member to be used together;
receiving from the first member information about the recommendation including data associated with one or more reasons why one or more items included in the set of items are useful for a topic associated with the recommendation;
storing the recommendation including the set of items selected by the first member and the information about the recommendation provided by the first member, wherein storing the recommendation comprises determining one or more tags to be associated with the recommendation, wherein determining one or more tags to be associated with the recommendation comprises one or more of the following: receiving one or more tags from the first member, prompting the first member for one or more tags, parsing the recommendation to determine one or more tags, and determining one or more tags associated with one or more items included in the set; and
presenting the recommendation including the set of items selected by the first member and the information about the recommendation provided by the first member including the data associated with one or more reasons why one or more items included in the set of items are useful for the topic associated with the recommendation to a second member of the online community based at least in part on an indication that the recommendation is of interest to the second member.

2. A method as recited in claim 1, wherein information about the recommendation comprises one or more of the following: one or more reasons for selecting one or more items included in the set, one or more reasons for selecting one or more options associated with one or more items included in the set, one or more manners in which to configure one or more items included in the set, one or more ways to use one or more items included in the set, one or more examples of how one or more items included in the set have been used for a topic associated with the recommendation, information about the first member, information to support the recommendation, and one or more tags to be associated with the recommendation.

3. A method as recited in claim 1, wherein the recommendation is stored in a searchable database.

4. A method as recited in claim 1, wherein the indication that the recommendation is of interest to the second member is based at least in part on one or more of the following: current activity of the second member with respect to the online community and past activity of the second member with respect to the online community.

5. A method as recited in claim 1, wherein the indication that the recommendation is of interest to the second member comprises one or more of the following: an indication of interest in a topic associated with the recommendation, an indication of interest in a tag associated with the recommendation, an indication of interest in an item included in the set, an indication of interest in a type of item included in the set, and an indication of interest in a tag associated with an item included in the set.

6. A method as recited in claim 1, wherein the indication that the recommendation is of interest to the second member is received in response to one or more of the following: the second member viewing or navigating to a page associated with an item included in the set, the second member viewing or navigating to a page associated with an item that is similar to an item included in the set, the second member viewing or navigating to a page associated with a topic associated with the recommendation, the second member conducting a search using one or more search terms associated with one or more items included in the set, the second member conducting a search using one or more search terms associated with a topic associated with the recommendation, the second member adding an item included in the set to an online cart, and the second member adding an item similar to an item included in the set to an online cart.

7. A method as recited in claim 1, wherein presenting the recommendation to a second member of the online community includes presenting to the second member an option to vote on a usefulness of the recommendation.

8. A method as recited in claim 1, further comprising associating a usefulness score with the recommendation.

9. A method as recited in claim 8, wherein the second member is part of a set of members to whom the recommendation has been presented and wherein the usefulness score is based at least in part on votes by one or more members included in the set of members to whom the recommendation has been presented.

10. A method as recited in claim 8, wherein the usefulness score is based at least in part on a reputation of the first member.

11. A method as recited in claim 1, wherein presenting the recommendation to a second member of the online community includes presenting to the second member one or more of the following: options to select one or more items in the set for purchase, options to specify one or more product options associated with one or more items included in the set, options to specify one or more quantities associated with one or more items included in the set, options to view other items that are similar to one or more items included in the set, options to add one or more items not included in the set, options to remove one or more items included in the set, an option to see reviews of the recommendation, an option to review the recommendation, options to see reviews of one or more items in the set, options to review one or more items in the set, options to vote for one or more tags associated with the recommendation, and an option to add one or more tags to the recommendation.

12. A method as recited in claim 1, further comprising providing a link to the recommendation.

13. A method as recited in claim 1, wherein the first member is not an employee of an online store.

14. A method as recited in claim 1, wherein at least one of the first member and the second member is a user of an online store.

15. A method as recited in claim 1, wherein one or more items included in the set have a thematic relationship.

16. A method as recited in claim 1, wherein the recommendation is associated with one or more topics.

17. A method as recited in claim 1, wherein receiving from the first member a selection of a set of items to be included in the recommendation includes receiving from the first member one or more specifications of options associated with one or more items included in the set.

18. The method of claim 1, wherein complementary items include at least two items of the set of items that are to be combined to perform a combined function different from a function associated with any individual item of the set of items.

19. A system for providing a recommendation, comprising: a processor configured to:

receive an indication of a selection of an option by a first member of an online community to create a recommendation to be presented to one or more other members of the online community;

provide to the first member a user interface for defining the recommendation;

receive from the first member via the user interface a selection of a set of items to be included in the recommendation, wherein the set of items comprises complementary items recommended by the first member to be used together;

receive from the first member information about the recommendation including data associated with one or more reasons why one or more items included in the set of items are useful for a topic associated with the recommendation;

store the recommendation including the set of items selected by the first member and the information about the recommendation provided by the first member, wherein storing the recommendation comprises determining one or more tags to be associated with the recommendation, wherein determining one or more tags to be associated with the recommendation comprises one or more of the following: receiving one or more tags from the first member, prompting the first member for one or more tags, parsing the recommendation to determine one or more tags, and determining one or more tags associated with one or more items included in the set; and present the recommendation including the set of items selected by the first member and the information about the recommendation provided by the first member including the data associated with one or more reasons why one or more items included in the set of items are useful for the topic associated with the recommendation to a second member of the online community based at least in part on an indication that the recommendation is of interest to the second member; and a memory coupled to the processor and configured to provide instructions to the processor.

20. A system as recited in claim 19, wherein at least one of the first member and the second member is a user of an online store.

21. A system as recited in claim 19, wherein one or more items included in the set have a thematic relationship.

22. A system as recited in claim 19, wherein to receive from the first member a selection of a set of items to be included in the recommendation includes to receive from the first member one or more specifications of options associated with one or more items included in the set.

23. A system as recited in claim 19, wherein to receive from the first member a selection of a set of items to be included in the recommendation includes to receive from the first member information about the recommendation.

24. A system as recited in claim 19, wherein the indication that the recommendation is of interest to the second member is based at least in part on one or more of the following: current activity of the second member with respect to the online community and past activity of the second member with respect to the online community.

25. A system as recited in claim 19, wherein the indication that the recommendation is of interest to the second member comprises one or more of the following: an indication of interest in a topic associated with the recommendation, an indication of interest in a tag associated with the recommendation, an indication of interest in an item included in the set, an indication of interest in a type of item included in the set, and an indication of interest in a tag associated with an item included in the set.

26. A system as recited in claim 19, wherein the processor is further configured to associate a usefulness score with the recommendation.

27. A computer program product for providing a recommendation, the computer program product being embodied in a computer readable medium and comprising computer instructions for:
   receiving an indication of a selection of an option by a first member of an online community to create a recommendation to be presented to one or more other members of the online community;
   providing to the first member a user interface for defining the recommendation;
   receiving from the first member via the user interface a selection of a set of items to be included in the recommendation, wherein the set of items comprises complementary items recommended by the first member to be used together;
   receiving from the first member information about the recommendation including data associated with one or more reasons why one or more items included in the set of items are useful for a topic associated with the recommendation;
   storing the recommendation including the set of items selected by the first member and the information about the recommendation provided by the first member, wherein storing the recommendation comprises determining one or more tags to be associated with the recommendation, wherein determining one or more tags to be associated with the recommendation comprises one or more of the following: receiving one or more tags from the first member, prompting the first member for one or more tags, parsing the recommendation to determine one or more tags, and determining one or more tags associated with one or more items included in the set; and
   presenting the recommendation including the set of items selected by the first member and the information about the recommendation provided by the first member including the data associated with one or more reasons why one or more items included in the set of items are useful for the topic associated with the recommendation to a second member of the online community based at least in part on an indication that the recommendation is of interest to the second member.

28. A computer program product as recited in claim 27, wherein one or more items included in the set have a thematic relationship.

29. A computer program product as recited in claim 27, wherein receiving from the first member a selection of a set of items to be included in the recommendation includes receiving from the first member information about the recommendation.

30. A computer program product as recited in claim 27, wherein the recommendation is stored in a searchable database.

31. A computer program product as recited in claim 27, further comprising computer instructions for associating a usefulness score with the recommendation.

32. A computer program product as recited in claim 27, wherein the recommendation is associated with one or more topics.

* * * * *